United States Patent
Almy et al.

(10) Patent No.: US 6,609,216 B1
(45) Date of Patent: Aug. 19, 2003

(54) METHOD FOR MEASURING PERFORMANCE OF CODE SEQUENCES IN A PRODUCTION SYSTEM

(75) Inventors: John W. Almy, Apalachin, NY (US); Frank S. Samuel, Jr., Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 09/596,139

(22) Filed: Jun. 16, 2000

(51) Int. Cl.[7] .................................................. H02H 3/05
(52) U.S. Cl. ........................... 714/25; 714/35; 714/38; 717/127; 717/130; 717/131
(58) Field of Search ........................... 714/25, 34, 35, 714/47, 38; 702/182, 186, 187; 717/127, 130, 131

(56) References Cited

U.S. PATENT DOCUMENTS

| | | | |
|---|---|---|---|
| 4,958,275 A | | 9/1990 | Yokouchi |
| 5,047,919 A | * | 9/1991 | Sterling et al. ................ 714/47 |
| 5,050,168 A | * | 9/1991 | Paterson ....................... 714/35 |
| 5,146,589 A | | 9/1992 | Peet, Jr. et al. |
| 5,301,198 A | * | 4/1994 | Kawasaki .................... 717/131 |
| 5,317,726 A | | 5/1994 | Horst |
| 5,371,689 A | * | 12/1994 | Tatsuma ...................... 702/186 |
| 5,467,463 A | | 11/1995 | Siegel |
| 5,671,402 A | | 9/1997 | Nasu et al. |
| 5,790,858 A | * | 8/1998 | Vogel .......................... 717/130 |
| 5,949,971 A | | 9/1999 | Levine et al. |
| 6,016,466 A | * | 1/2000 | Guinther et al. ............. 702/187 |
| 6,332,212 B1 | * | 12/2001 | Organ et al. ................. 717/128 |

* cited by examiner

Primary Examiner—Robert Beausoliel
Assistant Examiner—Yolanda L. Wilson
(74) Attorney, Agent, or Firm—RatnerPrestia; Arthur J. Samodovitz, Esq.

(57) ABSTRACT

A method for measuring performance of test points having one or more instructions in a code sequence. A code sequence with two or more test points is repetitively executed, while measuring the execution time. The code sequence is modified by removing one test point. The modified code sequence is repetitively executed, again measuring the execution time. The modification and execution steps are repeated until no test points remain in the current code sequence. All execution and modification steps are repeated a defined number of times, saving the execution times to a data file. The minimum execution time for each code sequence from any run is assigned to that code sequence. The execution time of a particular test point is calculated by subtracting the assigned execution time for the code sequence after removing the particular test point from the assigned execution time for the code sequence be fore removing the particular test point.

12 Claims, 8 Drawing Sheets

Run on Host  AQMVSOE on Fri Oct 22 10:52:37 1999
Fixed Point Addition
Main    x23508e38  Version=0  loops=5  reps = 1000  offset=0  xline_size = 0x100
Path to program =
Program name = timeFADD

| Testcase | | | Reps | Location | Cpu Times | | | | |
|---|---|---|---|---|---|---|---|---|---|
| X0700 | 0700 | 0700 | 1.00E+003 | X23536900 | 72.8125 | 12.0469 | 13.4375 | 12.0469 | 12.0469 |
| X0700 | 0700 | 0700 | 1.00E+003 | X23536900 | 14.0469 | 14.0313 | 14.0469 | 14.0469 | 14.3281 |
| X0700 | 0700 | 0700 | 1.00E+003 | X23536900 | 16.0469 | 16.0469 | 16.0469 | 16.2344 | 16.2188 |
| X0700 | 0700 | 0700 | 1.00E+003 | X23536900 | 18.0313 | 18.0469 | 18.0469 | 19.0469 | 18.0469 |
| X0700 | 586b | 586b | 1.00E+003 | X23536900 | 20.2344 | 20.0469 | 20.0313 | 20.0469 | 21.4375 |
| X0700 | 586b | 0000 | 1.00E+003 | X23536900 | 20.0469 | 22.0469 | 22.0625 | 22.0469 | 22.7813 |
| X586b | 0000 | 5866 | 1.00E+003 | X23536900 | 22.0469 | 26.1094 | 26.2969 | 26.9375 | 26.3594 |
| X5866 | 0000 | 5866 | 1.00E+003 | X23536900 | 26.1094 | 32.5156 | 32.0938 | 34.1094 | 32.6719 |
| X5866 | 0000 | 587b | 1.00E+003 | X23536900 | 32.5156 | 34.0625 | 47.5156 | 35.5469 | 34.1719 |
| X587b | 0000 | 5877 | 1.00E+003 | X23536900 | 34.0625 | 40.0625 | 40.5469 | 40.2031 | 43.6719 |
| X5877 | 0004 | 5877 | 1.00E+003 | X23536900 | 40.0625 | 46.2031 | 47.4375 | 47.4063 | 47.4531 |
| X5877 | 0000 | 5877 | 1.00E+003 | X23536900 | 46.2031 | 48.2031 | 48.9531 | 62.0469 | 49.5625 |
| X5877 | 0000 | 1a67 | 1.00E+003 | X23536900 | 48.8125 | 50.0625 | 108.2188 | 51.9688 | 55.8594 |
| X1a67 | 587b | 0008 | 1.00E+003 | X23536900 | 70.5156 | 56.2500 | 69.9531 | 56.5156 | 57.2813 |
| X587b | 0008 | 5877 | 1.00E+003 | X23536900 | 62.1875 | 62.0625 | 62.3281 | 63.7656 | 63.7969 |
| X5877 | 0000 | 5067 | 1.00E+003 | X23536900 | 69.2656 | 62.2500 | 62.3750 | 64.4375 | 63.6250 |
| X5067 | 0000 | 0700 | 1.00E+003 | X23536900 | 62.4375 | 62.0781 | 62.0625 | 62.2344 | 63.0000 |
| X0700 | 0700 | 0700 | 1.00E+003 | X23536900 | 64.2344 | 62.2188 | 62.2656 | 62.2344 | 63.2969 |
| X0700 | 0700 | 0700 | 1.00E+003 | X23536900 | 92.3438 | | | | |

FIG. 3A

Run on Host  AQMVSOE

| Testcase | Reps | Location | 321 max | 322 min | 323 avg | 324 %sd |
|---|---|---|---|---|---|---|
| X0700 0700 0700 | 1.00E+003 | X23536900 | 72.81250 | 12.0469 | 24.4781 | 98.75% |
| X0700 0700 0700 | 1.00E+003 | X23536900 | 14.32813 | 14.0313 | 14.1000 | 0.81% |
| X0700 0700 0700 | 1.00E+003 | X23536900 | 16.23438 | 16.0469 | 16.1188 | 0.55% |
| X0700 0700 586b | 1.00E+003 | X23536900 | 19.04688 | 18.0313 | 18.2438 | 2.20% |
| X0700 586b 0000 | 1.00E+003 | X23536900 | 21.43750 | 20.0313 | 20.3594 | 2.67% |
| X586b 0000 5866 | 1.00E+003 | X23536900 | 22.78125 | 22.0469 | 22.2000 | 1.31% |
| X5866 0000 5866 | 1.00E+003 | X23536900 | 26.93750 | 26.0625 | 26.3531 | 1.19% |
| X5866 0000 587b | 1.00E+003 | X23536900 | 34.10938 | 32.0938 | 32.6969 | 2.27% |
| X587b 0004 5877 | 1.00E+003 | X23536900 | 47.51563 | 34.0625 | 38.4000 | 13.44% |
| X5877 0000 5877 | 1.00E+003 | X23536900 | 43.67188 | 40.0625 | 40.9500 | 3.35% |
| X5877 0000 1a67 | 1.00E+003 | X23536900 | 47.45313 | 46.2031 | 46.9531 | 1.25% |
| X1a67 587b 0008 | 1.00E+003 | X23536900 | 62.04688 | 48.2031 | 51.5156 | 10.26% |
| X587b 0008 5877 | 1.00E+003 | X23536900 | 108.21880 | 50.0625 | 67.3250 | 32.19% |
| X5877 0000 5067 | 1.00E+003 | X23536900 | 69.95313 | 56.2500 | 50.4375 | 8.64% |
| X5067 0000 0700 | 1.00E+003 | X23536900 | 69.26563 | 62.0625 | 64.2438 | 4.06% |
| X0700 0700 0700 | 1.00E+003 | X23536900 | 64.23750 | 62.2500 | 63.0250 | 1.37% |
| X0700 0700 0700 | 1.00E+003 | X23536900 | 64.23438 | 62.0625 | 62.7219 | 1.32% |
| X0700 0700 0700 | 1.00E+003 | X23536900 | 92.34375 | 62.2188 | 68.6438 | 17.27% |

FIG. 3B

| Inst | AQMVSOE #Instruction Loop Time | Time | cycle time 1.984375 Est cycles | observed | delta | delta cyc | rnd(cycles) | Est Act |
|---|---|---|---|---|---|---|---|---|
| 0 | NOPR | 0 | 1 | 12.04688 | | | | |
| 1 | NOPR | 0 | 1 | 14.03125 | 1.98438 | 1.00000 | 1 | 0 |
| 2 | NOPR | 0 | 1 | 16.04688 | 2.01563 | 1.01575 | 1 | 0 |
| 3 | NOPR | 0 | 1 | 18.03125 | 1.98438 | 1.00000 | 1 | 0 |
| 4 | NOPR | 0 | 1 | 20.03125 | 2.00000 | 1.00787 | 1 | 0 |
| 5 | L R6,0(R11) | | 1 | 22.04688 | 2.01563 | 1.01575 | 1 | 0 |
| 6 | L R6,0(R6) | | 3 | 26.06250 | 4.01563 | 2.02362 | 2 | 1 |
| 7 | L R6,0(R6) | | 3 | 32.09375 | 6.03125 | 3.03937 | 3 | 0 |
| 8 | L R7,4(R11) | | 1 | 34.06250 | 1.96875 | 0.99213 | 1 | 0 |
| 9 | L R7,0(R7) | | 3 | 40.06250 | 6.00000 | 3.02362 | 3 | 0 |
| 10 | L R7,0(R7) | | 3 | 46.20313 | 6.14063 | 3.09449 | 3 | 0 |
| 11 | AR R6,R7 | | 1 | 48.20313 | 2.00000 | 1.00787 | 1 | 0 |
| 12 | L R7,8(R11) | | 1 | 50.06250 | 1.85938 | 0.93701 | 1 | 0 |
| 13 | L R7,0(R7) | | 3 | 56.25000 | 6.18750 | 3.11811 | 3 | 0 |
| 14 | ST R6,0(R7) | | 3 | 62.06250 | 5.81250 | 2.92913 | 3 | 0 |
| 15 | Same | 0 | | 62.25000 | 0.18750 | 0.09449 | 0 | 0 |
| 16 | Same | 0 | | 62.06250 | −0.18750 | −0.09449 | 0 | 0 |
| 17 | Same | 0 | | 62.21875 | 0.15625 | 0.07874 | 0 | 0 |
| | sum of cycles sum of times | | 26 51.59375 | 25.28346 50.17188 | | 25.2835 | 25 | 1 |
| | 341 | | 342 | 343 | 344 | 345 | 346 | 347 |

FIG. 3D

METHOD FOR MEASURING PERFORMANCE OF CODE SEQUENCES IN A PRODUCTION SYSTEM

TECHNICAL FIELD

The present invention relates generally to computer systems and more specifically to a method for measuring performance (execution time) of code sequences on a production system and optimizing such code sequences.

BACKGROUND OF THE INVENTION

Programmers, hardware developers, and performance analysts have a need to determine the execution time in central processing unit (CPU) cycles associated with particular instructions in a code sequence to determine the optimum way to code the sequence. One method currently used to measure code sequence performance incorporates instrumentation to measure the period of performance for a code sequence. The instrumentation approach requires, however, a stand-alone run for the code sequence to be tested, access to an instrumented machine, and access to reduction tools to calculate performance. In addition, the instrumentation method can result in large errors in cycle time assignment because the instrumentation cannot always determine which operation is executing during any given cycle.

U.S. Pat. No. 5,949,971, issued to Levine et al. and assigned to the assignee of the subject invention, teaches a method for measuring the length of time to execute a serialization of instructions in a pipeline of a processing system, for use in optimizing software. This patent achieves an end result similar to the present invention, namely measuring execution time for a code sequence, by using special hardware and monitors. Thus, the patent is one example of the instrumentation method. The required use of special hardware and monitors is undesirable.

Another approach to performance measurement is disclosed by U.S. Pat. No. 5,671,402 issued to Nasu et al. Nasu et al. disclose a method of counting cumulative clock cycles during simulation of operation of a data processor for executing a program. Nasu et al. do not provide performance measurement on a non-dedicated production system. Instead, the simulation method requires a dedicated system to run the simulation, as well as access to processing algorithms. Dedicated access for simulation can be a problem in typical system applications. Also, the disclosed method cannot provide performance measurement of individual instructions in a sequence or goodness of fit testing. Yet another problem is that the test cases must meet strict requirements to be run and the results must be interpreted. The interpretation of results often involves selections for which the criteria are ambiguous.

The deficiencies of the conventional methods for measuring performance of code sequences show that a need still exists for improvement. To overcome the shortcomings of the conventional methods, a new method for measuring code sequence performance in a non-dedicated system environment is needed.

Therefore, it is an object of the present invention to provide a method for measuring the performance (i.e., execution time) of individual test points, each comprising one or more instructions, in a non-dedicated production system. It is a further object of the present invention to provide a method for measuring the performance of test points, comprising one or more instructions, without relying solely on averaging to determine the execution time of the test point. It is yet another object of the present invention to provide a way to check the goodness of performance measurement data.

SUMMARY OF THE INVENTION

To achieve these and other objects, and in view of its purposes, the present invention provides a method for measuring performance of code sequences and individual instructions or groups of instructions within a code sequence on a non-dedicated production system.

The invention uses a test case program and a driver to set up a sequence of instructions (test case sequence) to be measured and systematically determines the number of hardware cycles to attribute to each test point (one or more instructions for which execution time is to be measured) in that sequence. Because optimization in hardware can make an instruction or group of instructions run faster in some specific environments or sequences that are common, the cycle time of each test point can only be computed within the context of a specific sequence of instructions.

The algorithm uses a store clock to determine the number of cycles required for each test point. The (system) clock value is captured at the initiation of the test case program; the test case program is run a preselected number of times (e.g., 1,000 times) for the initial test case sequence (test points 1 through n); and the ending value of the clock is captured and saved to a text file as the first test case sequence time. Then, one test point (test point n) is removed from the sequence of test points to create a second test case sequence, and the second test case program is run again using the new test case sequence (test points 1 through (n−1)), again capturing the starting clock value and the ending clock value. The difference between the starting clock value and the ending clock value for the second test case sequence is saved to the text file as the second test case sequence time. The difference between the first sequence time and the second sequence time is attributed to the instruction removed (instruction n), as the number of cycles used to execute that instruction. The process is repeated removing a second test point (test point (n−1)) to determine the time for executing test point (n−1), removing a third test point (n−2) to determine the time for executing test point (n−2), and so on until no instructions are left in the test case sequence. Thus, test point n in the sequence has an execution time equal to the time for the test case sequence (test points 1 through n) minus the time for the test case sequence (test points 1 through (n−1)).

The present invention provides considerable improvement over the prior art. One key advantage is that performance data can be generated for code sequences in a production environment. Because the execution times are based on minimum times rather than averages, the present invention can account for times when the processor is interrupted during the test case sequence. Another advantage is that the present invention can determine execution time for each test point within a code sequence. This ability is useful in optimizing code sequences, especially in a compiler where a high-level instruction is translated into the most efficient assembler or machine code. By assigning execution time for each instruction or group of instructions, the invention can be used to quantify the benefits of a specific instruction sequence over another one and to predict the overall system performance improvement due to a switch. Also, the present invention can provide a goodness check of the execution time data.

It should be understood that both the foregoing general description and the following detailed description are exemplary, but are not restrictive, of the invention.

BRIEF DESCRIPTION OF THE DRAWING

The features and advantages of a method for measuring performance of code sequences and individual instructions within a code sequence on a non-dedicated production system will be more clearly understood from the following description when read in connection with the accompanying drawing. Included in the drawing are the following figures.

DETAILED DESCRIPTION OF THE INVENTION

The present invention will be described in detail with reference to the accompanying drawing in which like reference numbers designate similar or corresponding elements and steps. One embodiment of the present invention provides a method for measuring performance of code sequences and individual instructions or groups of instructions (test points) within a code sequence on a non-dedicated production system, comprising a test case program, a driver, and an analysis program.

Figure 1:
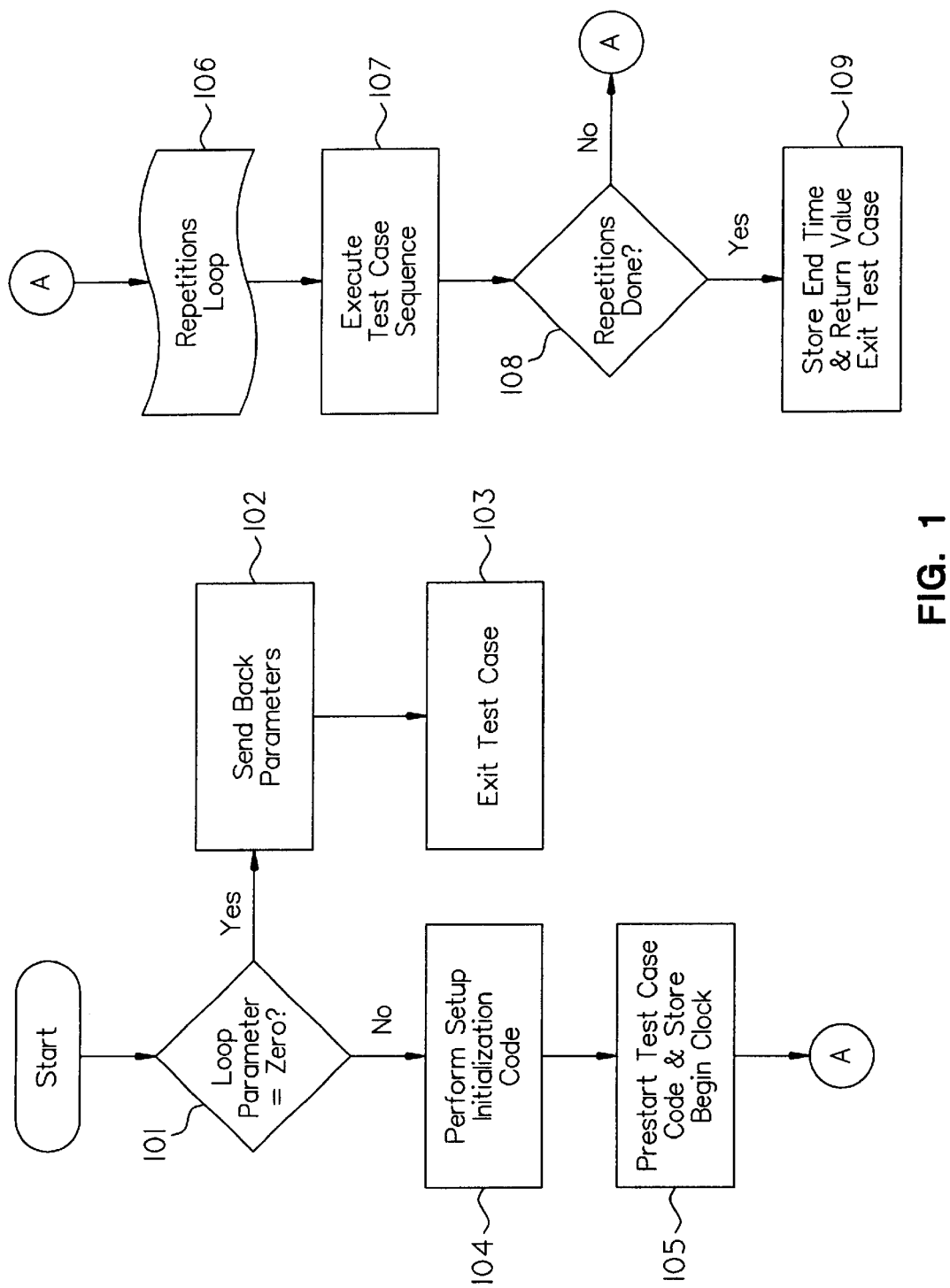
FIG. 1 shows a flow diagram of a test case program for measuring performance of instructions in a code sequence according to the present invention.

In one embodiment of the present invention, shown in FIG. 1, the test case program stores a starting value from the system clock (BEGIN CLOCK); repetitively performs a code sequence (test case sequence) including a number of control instructions, a series of test points, and an end sequence; stores an ending value from the system clock (END CLOCK); and returns BEGIN CLOCK and END CLOCK values to a driver. The driver, shown in FIGS. 2A, 2B, and 2C, loads the test case program, runs the test case program for the initial (first) test case sequence (all test points, including a number of control instructions), modifies the test case sequence by removing one test point, runs the test case program for the new test case sequence, and repeats the steps of modifying the test case sequence and running the test case program until the final test case sequence contains no control instruction test points (e.g., an empty timing loop). The process is repeated a number of times from the first test case sequence through the final test case sequence. The analysis program, whose output is shown in FIG. 3, collects the performance data generated by the test case program, calculates execution times for each sequence of instructions based on the minimum measured time, and provides a goodness of fit check of the data.

Referring now to FIG. 1, when the test case program is started, it determines whether loop parameters are known to the driver (step 101). If the driver does not have the loop parameters (e.g., parameters equal zero), then the addresses of the test case parameters are returned to the driver (step 102) and the test case program is exited (step 103). Loop parameters preferably comprise the version of the driver for which the test case program was written, the size of the test case program, the number of bytes of an end block of code instructions which will be moved to remove a test point from the test case sequence, the address of the end block, the address of a descriptor code identifying the test case program, the number of test points in the test case sequence, and the locations or offsets of the test points from the start of the initial test case sequence.

If the loop data are known to the driver in step 102 (e.g., the loop parameters are not equal to zero), then the test case program performs a setup initialization code (step 104). The setup initialization code creates the environment that would exist when the test points were run. For example, operands are initiated to appropriate beginning values, and levels of address indirection are created as required.

Next, the test case program performs pre-start test case code (step 105), in which un-timed control instructions are performed and a BEGIN CLOCK value is stored. The un-timed control instructions (e.g., NOOPs) isolate the test case sequence from the setup initialization code. The BEGIN CLOCK value is stored twice to synchronize the stored value with the system clock. The second value stored as BEGIN CLOCK will be at the beginning of the store clock latency period, which may be as long as seven or eight cycles of the system clock.

The repetitions loop runs the test case sequence repetitively for a desired number of repetitions (step 106). The desired number of repetitions is defined by the driver. Empirical data generated by the inventors suggest that one thousand repetitions are effective to achieve sufficient resolution of execution time without excessive interruptions which invalidate a particular time measurement. The repetitions loop can be run, for example, for the defined number of repetitions by storing the defined number of repetitions in a counter memory location and decrementing the counter at the beginning of the repetitions loop. The test case program determines whether the defined number of repetitions has been completed (step 108). When the counter reaches zero, the repetitions loop is exited (step 109).

The repetitions loop executes the test case sequence (step 107), comprising a number of control instruction test points, a number of instruction test points, and an end block. If the defined number of repetitions has not been reached, then the test case program returns to the beginning of the repetition loop (step 106). If the defined number of repetitions has been completed, then the test case program stores the END CLOCK value and returns the BEGIN CLOCK and END CLOCK values to the driver (step 109).

Figure 2A:
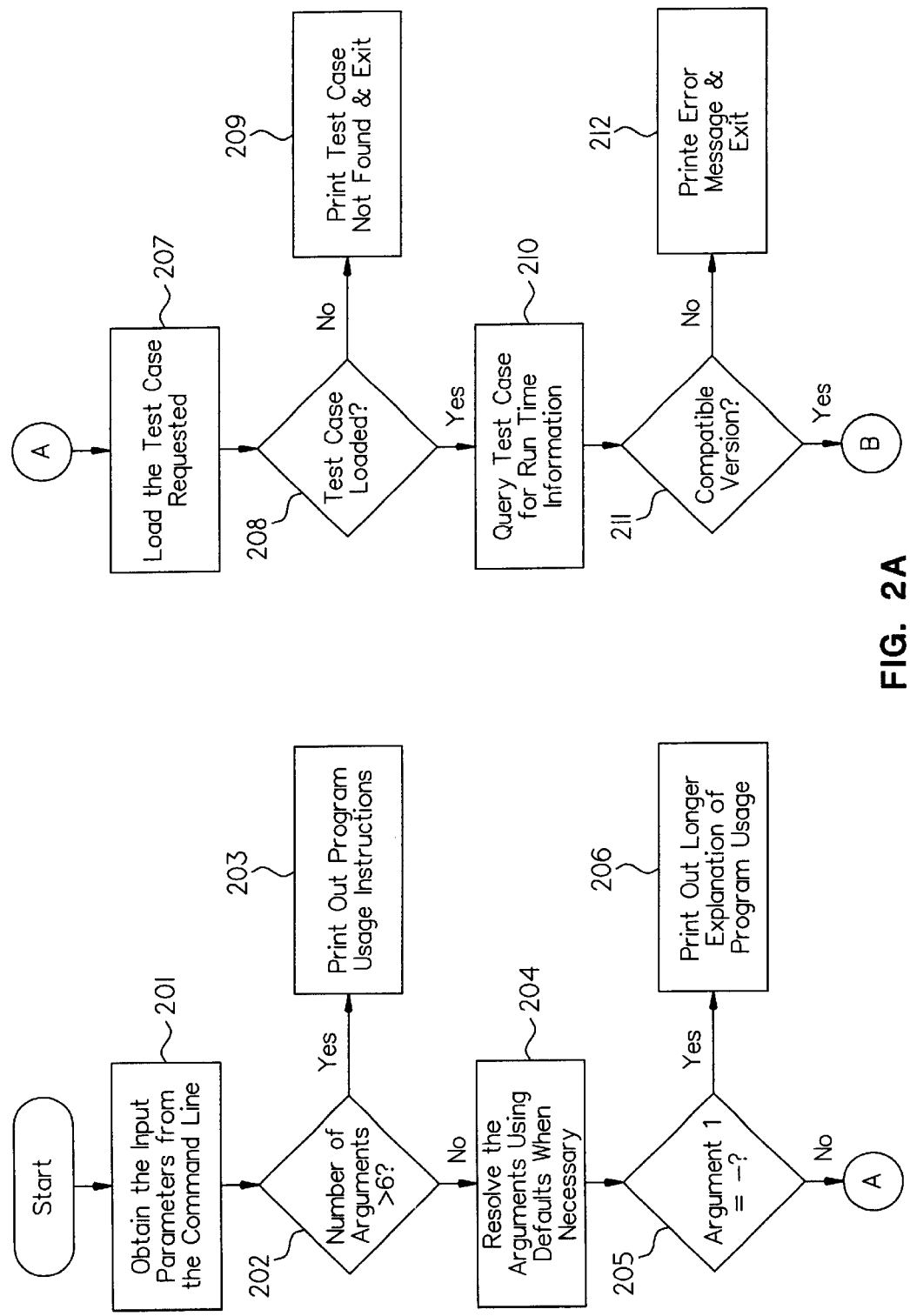
FIGS. 2A, 2B, and 2C combine to show a flow diagram of a driver for loading the test case program of FIG. 1, modifying the test case sequence from the test case program, running the test case program, and downloading the start clock and end clock times to an analysis program.
Figure 3C:
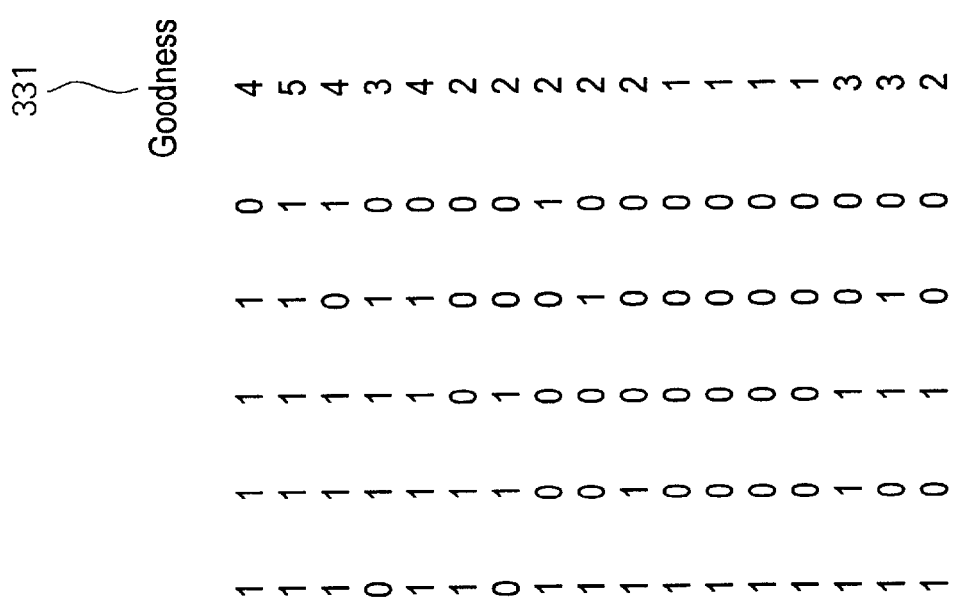
FIG. 3 shows the output of an analysis program presenting performance data generated by the test case program of FIG. 1.

Referring now to FIG. 2A, the present invention provides a driver that can load, run, and modify various test case programs to measure the performance of test points in the particular test case sequence in the test case program selected. First, the driver obtains the input parameters from a command line provided by an operator (step 201). Next, the driver determines whether the number of arguments in the command line is greater than six (step 202).

If the number of arguments provided in the command line is greater than six (e.g., more than the driver is seeking), then the driver prints out program usage instructions (step 203). If the number of arguments is not greater than six, then the driver resolves the arguments using default values as necessary (step 204). Argument one is the test case program name, and must be provided in order to run a test case. Argument two defines the number of times that a main loop will be executed (i.e., runs). A main loop consists of executing the initial test case for a defined number of repetitions, modifying the test case, executing the new test case for a defined number of repetitions, and repeating the modification and execution steps until no test points are left (e.g., an empty timing loop is executed). If no value is provided for argument two, then a default value of twenty is used. Argument three defines the number of repetitions of a test case sequence that the test case program will execute. If no value is provided for argument three, then a default value of one thousand is used. Argument four defines the offset, or location in the cache where the program should be saved. If no value is provided for argument four, then a default value of zero is used. Argument five defines the length of a cache line. If no value is provided for argument five, then a default value of two hundred fifty six is used.

The driver then determines whether argument one indicates a request for help (step 205). For example, a request for help in a UNIX system would be input if argument one equals "–". If a request for help is received in step 205, then the driver prints out a more detailed explanation of program usage (step 206). If a request for help is not received in step 205, then the driver loads the requested test case (i.e., the test case defined by argument one) (step 207) using the program name.

The driver then determines whether the test case program is loaded (step 208). If the test case program is not loaded in step 208, then the driver prints out a message indicating that the defined test case program was not found (step 209), and the driver is exited. If the test case program is loaded in step 208, then the driver retrieves the loop parameters from the test case program (step 210). The loop parameters preferably comprise the version of the driver for which the test case program was written, the size of the test case program, the number of bytes of an end block of code instructions which will be moved to remove a test point from the test case sequence, the address of the end block, the address of a descriptor code identifying the test case program, the number of test points in the test case sequence, and the locations or offsets of the test points from the start of the initial test case sequence.

The driver determines whether the version of the driver for which the test case program was programmed is compatible with the version of the driver being used (step 211). If the versions are not compatible in step 211, then the driver prints out an error message (step 212) and the driver is exited. If the versions are compatible in step 211, then the driver allocates memory to copy the test case program (step 213 in FIG. 2B) using program and line sizes.

Figure 2B:
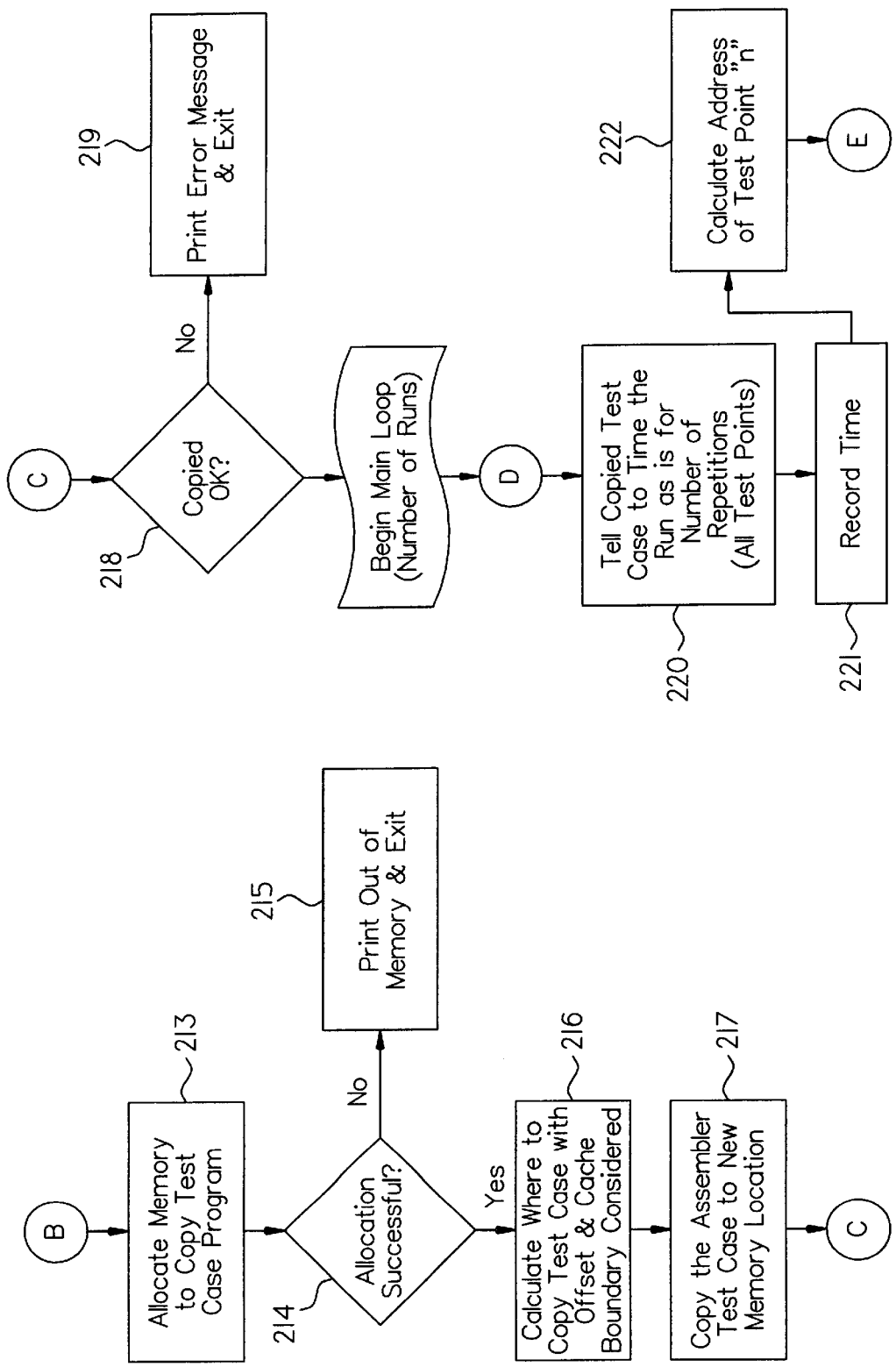

Referring to FIG. 2B, the driver determines whether the memory allocation of step 213 was successful (step 214). If the allocation was not successful, then the driver prints an "out of memory" message (step 215), and the driver is exited. If the allocation was successful, then the driver calculates where to copy the test case program using the offset (argument four) and line size (argument five) values (step 216). The driver calculates where to copy the test case program to prevent the driver from refreshing the cache during execution of the test case sequence. After the driver calculates where to copy the test case program, the driver copies the test case program to a new memory location which is not write-protected (step 217).

The driver determines whether the test case program has been successfully copied to a new memory location which is not write-protected (step 218). If the test case program has not been successfully copied, then the driver writes an error message (step 219) and the driver is exited. If the test case program has been successfully copied, then the driver executes a main loop for a number of runs as determined by argument two. The test case sequence is executed for the number of repetitions defined in argument 3 or the default and timed for the initial test case sequence (step 220). The BEGIN CLOCK and END CLOCK values for the initial test case sequence (i.e., all test points) are recorded to a data file (step 221), and the address of the test point "n" (i.e., the test point to be removed) is determined using the offset loop parameter (step 222).

Figure 2C:
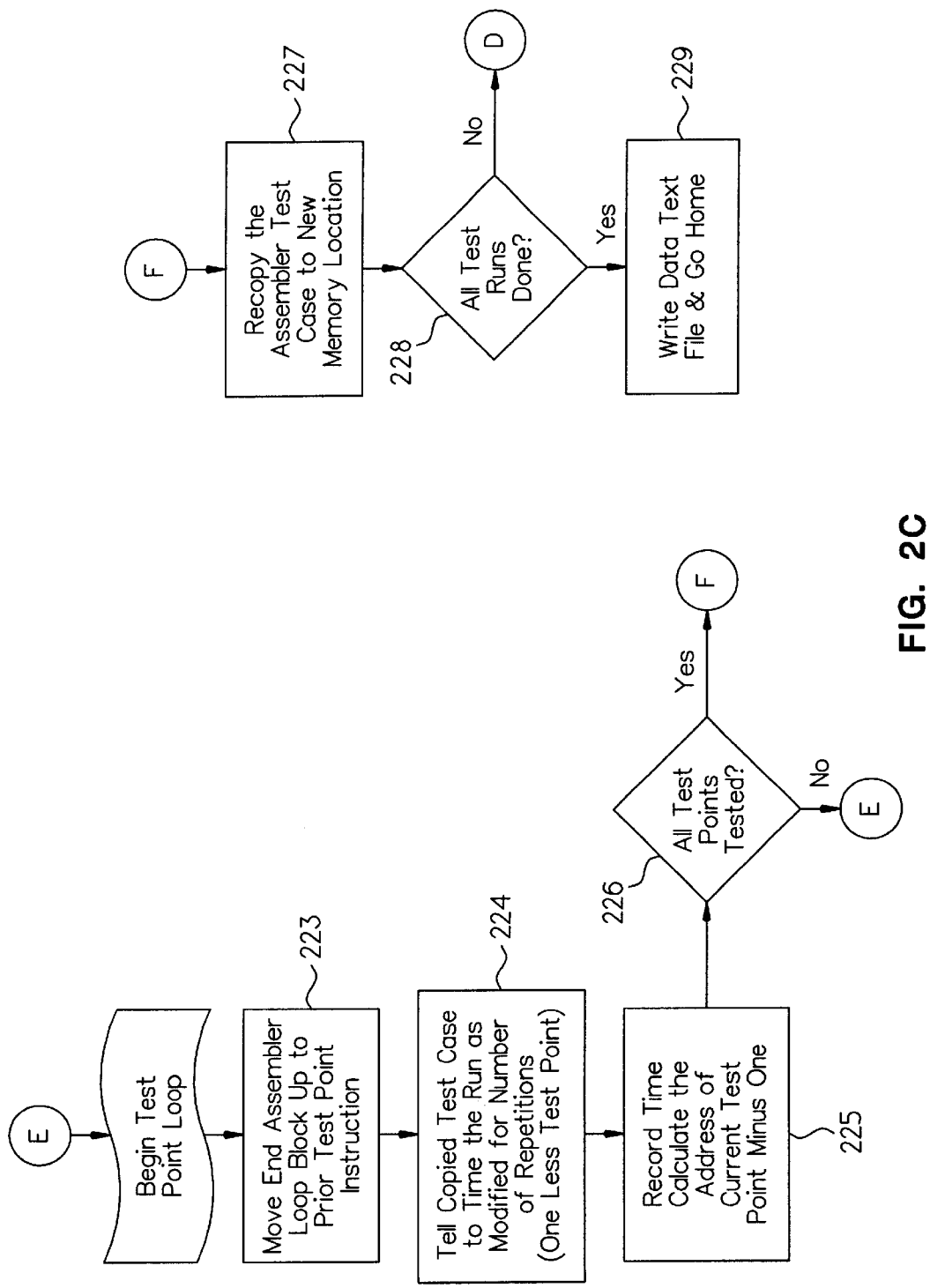

Referring to FIG. 2C, the driver begins the test point loop using the number of test points in the test case sequence. First, the driver modifies the test case sequence (step 223). This is done by moving the end block, whose address and size are provided by the test case program as loop parameters, to the address of test point "n" calculated in step 222. The end block is written over test point "n", creating a new test case sequence with test points "1" through "n–1" as shown in Table 1.

TABLE 1

| test case sequence before modification | test case sequence after modification |
|---|---|
| test point 1 (NOOP) | test point 1 (NOOP) |
| test point 2 (NOOP) | test point 2 (NOOP) |
| test point 3 (NOOP) | test point 3 (NOOP) |
| test point 4 (NOOP) | test point 4 (NOOP) |
| test point 5 (instruction(s) to be measured) | Test point 5 (instruction(s) to be measured) |
| test point 6 (instruction(s) to be measured) | Test point 6 (instruction(s) to be measured) |
| test point n-1 (instruction(s) to be measured) | test point n-1 (instruction(s) to be measured) |
| test point n (instruction(s) to be measured) | End block |
| end block | *** |

After modification, the new test case sequence is executed the number of repetitions defined by argument 3 or the default and timed (step 224). The new test case sequence comprises test points "1" through "n–1" after modification, as shown in Table 1. The BEGIN CLOCK and END CLOCK values for the modified test case sequence (i.e., one less test point than the previous test case sequence) are recorded to a data file (step 225), and the address of the test point "n–1" (i.e., the new test point to be removed) is determined using the offset loop parameter.

The driver determines whether all test points have been tested (e.g., whether each test point has been removed) (step 226). If all test points have not been tested, then the driver returns to step 223, and the test case sequence is again modified and executed, and its execution is timed and recorded to a data file. If all test points have been tested, then the driver recopies the test case program loaded in step 207 into a memory location that is not write-protected (step 227).

The driver determines whether the defined number of runs of the main loop have been completed (step 228). The number of runs is defined by argument two or defaults to twenty runs. If the defined number of runs have not been completed, then the driver returns to step 220 and performs another run of the main loop. If the defined number of runs have been completed, then the driver writes the data file to an analysis program (step 229) and the driver is exited. Step 229 is performed using the program name and the address of the descriptor code identifying the test case program.

EXAMPLE

The following example is included to more clearly demonstrate the overall nature of the invention. This example is exemplary, not restrictive, of the invention.

Referring now to FIG. 3, the BEGIN CLOCK and END CLOCK values for each test case sequence of each run are provided to an analysis program which provides four sections of data. In the first data section (301), the execution time (i.e., the difference between the END CLOCK and BEGIN CLOCK values) for each test case sequence of each run are determined and printed. Each column of the first section represents a run of the main loop. Each row of the first section represents a test case sequence. The test case sequences are provided in ascending order, with the first row representing a test case sequence consisting of only the first test point and the last row representing a test case sequence consisting of all test points.

In section two (302), the analysis program calculates and prints the maximum execution time (321), the minimum execution time (322), the average execution time (323), and the standard deviation of execution times (324) for each test case sequence. The third section (303) is a goodness of fit check. Starting with the second row of section 301, the execution times are compared to the minimum execution time for that test case sequence. A difference from the minimum execution time for that test case sequence of less than the goodness of fit threshold (0.2 nanoseconds) is considered a good fit and a "1" is assigned to that time. The total number of good fits are tallied in a separate column (331).

The fourth section (304) comprises seven columns. The first column (341) lists each of the test points in the test case program. The second column (342) lists the estimated number of computer cycles required to execute the test point in that row. The third column (343) provides the minimum execution time of the test case sequence ending with the test point in that row. The fourth column (344) lists the difference between the minimum execution time of the test case sequence of that row and the test case sequence of the previous row. The difference in the fourth column is the execution time attributed to the test point which has been removed between the present row and the previous row.

The fifth column (345) and the sixth column (346) are the number of computer cycles and the number of computer cycles rounded to an integer, respectively, attributable to the test point of that row. The number of computer cycles is determined by dividing the time (column 344) by the time for the control instruction known to require one computer cycle for execution. The seventh column (347) shows the differences between the estimated cycles for the test point of that row and the actual cycles for the test point of that row.

By using minimum measured execution times, the present invention can account for and eliminate measurements for a test case sequence which have been distorted by interruptions. This advantageously enables the present invention to accurately measure the performance of individual test points on a non-dedicated computer.

Although illustrated and described above with reference to certain specific embodiments, the present invention is nevertheless not intended to be limited to the details shown. Rather, various modifications may be made in details within the scope and range of equivalents of the claims and without departing from the spirit of the invention. For example, instructions could be removed from a point other than the end of the sequence for each modification. Also, the number of control instructions (NOOPs) performed before the instructions, the number of repetitions of each test point sequence, the number of runs for each main loop, and the goodness of fit threshold could be modified.

What is claimed:

1. A method for measuring performance of test points including one or more instructions in a code sequence, comprising the steps of:
    (a) repetitively executing a code sequence having two or more test points while measuring the execution time;
    (b) modifying the code sequence by removing one test point;
    (c) repetitively executing the modified code sequence while measuring the execution time;
    (d) repeating steps (b) and (c) until no test points remain in the current code sequence;
    (e) repeating steps (a) through (d) a defined number of times;
    (f) assigning the minimum execution time for each code sequence from any run to that code sequence; and
    (g) calculating the execution time of a particular test point by subtracting the assigned execution time for the code sequence after removing the particular test point from the assigned execution time for the code sequence prior to removing the particular test point.

2. The method of claim 1 wherein the defined number of times that steps (a) through (d) are repeated, and the number of times that execution of code sequences in steps (a) and (c) are repeated, are provided in a command line.

3. The method of claim 2 wherein the defined number of times that steps (a) through (d) are repeated defaults to a value of twenty, and the number of times that execution of code sequences in steps (a) and (c) is repeated defaults to a value of one thousand.

4. The method of claim 1 wherein the code sequence is modified by moving an end block to over-write the last test point in the code sequence.

5. The method of claim 1 further comprising performing a goodness of fit check of the execution time calculated for a test point by subtracting the assigned execution time for the code sequence after removing that test point from each of the times for executing the code sequence before removing that test point.

6. A system for measuring performance of test points, each including one or more instructions, in a code sequence on a non-dedicated computer, the system comprising:
    (a) a test case program which saves a BEGIN CLOCK value, repetitively executes a test case sequence with one or more test points, and saves an END CLOCK value;
    (b) a driver that repetitively runs a main loop which calls the test case program defining the number of repetitions to perform, saves the BEGIN CLOCK and END CLOCK values to a data file, modifies the test case program to remove one test point from the test case sequence, recalls the test case program, and repeats the modification and recalling of the test case program until the test case sequence consists of no test points; and
    (c) an analysis program that calculates the execution time for each test case sequence of each run of the main loop; assigns the minimum measured execution time as the assigned execution time for each test case sequence; and determines the execution time attributable to each test point by subtracting the assigned execution time for the test case sequence after removing that test point from the assigned execution time of the test case sequence prior to removing that test point.

7. The system of claim 6 wherein the analysis program further measures the goodness of fit of the execution time of each test point by determining how many runs of the test case sequence prior to removing that test point are within a threshold limit of the minimum execution time of the test case sequence prior to removing that test point.

8. The system of claim 7 wherein the threshold limit for the goodness of fit check is 0.2 nanoseconds.

9. The system of claim 6 wherein the driver modifies the test case program by moving an end block to over-write the last test point in the test case program.

10. A method for measuring performance of test points including one or more instructions in a code sequence, comprising the steps of:

(a) defining as defaults the number of times that steps (b) through (e) are repeated to a value of twenty and the number of times that execution of code sequences in steps (b) and (d) is repeated to a value of one thousand;

(b) repetitively executing a code sequence having two or more test points while measuring the execution time;

(c) modifying the code sequence by removing one test point and moving an end block to over-write the last test point in the code sequence;

(d) repetitively executing the modified code sequence while measuring the execution time;

(e) repeating steps (c) and (d) until no test points remain in the current code sequence;

(f) repeating steps (b) through (e) a defined number of times;

(g) assigning the minimum execution time for each code sequence from any run to that code sequence; and (h) calculating the execution time of a particular test point by subtracting the assigned execution time for the code sequence after removing the particular test point from the assigned execution time for the code sequence prior to removing the particular test point.

11. The method of claim 10 wherein the defined number of times that steps (a) through (d) are repeated, and the number of times that execution of code sequences in steps (a) and (c) are repeated, are provided in a command line.

12. The method of claim 10 further comprising performing a goodness of fit check of the execution time calculated for a test point by subtracting the assigned execution time for the code sequence after removing that test point from each of the times for executing the code sequence before removing that test point.

* * * * *